United States Patent [19]

Teramachi

[11] 4,127,309

[45] Nov. 28, 1978

[54] UNLIMITED SLIDING BALL SPLINE ASSEMBLY

[76] Inventor: Hiroshi Teramachi, 2-34-8, Higashi-tamagawa, Setagaya-ku, Tokyo, Japan

[21] Appl. No.: 819,286

[22] Filed: Jul. 27, 1977

[30] Foreign Application Priority Data

Aug. 18, 1976 [JP] Japan .................................. 51-097775

[51] Int. Cl.$^2$ ............................................. F16C 29/06
[52] U.S. Cl. ..................................... 308/6 C; 64/23.7
[58] Field of Search ............... 308/6 C, 6 B, 6 R, 183, 308/185, 189 R, 189 A, 201, 195, 198, 3 A, 188, 193; 64/23.7, 23, 23.6

[56] References Cited

U.S. PATENT DOCUMENTS

| | | | |
|---|---|---|---|
| 1,918,108 | 7/1933 | Jonkhoff | 308/6 C |
| 2,979,147 | 4/1961 | Naumann | 308/6 C X |
| 3,398,999 | 8/1968 | Halvorsen | 308/198 X |
| 3,659,435 | 5/1972 | Nilsson | 64/23.7 |
| 3,673,817 | 7/1972 | Doran et al. | 64/23.7 |

*Primary Examiner*—Barry L. Kelmachter
*Assistant Examiner*—Douglas C. Butler
*Attorney, Agent, or Firm*—Arthur T. Fattibene

[57] ABSTRACT

An unlimited sliding ball spline assembly performs rectilinear motion in the axial direction and rotational motion to transmit torque individually or jointly according to its purpose. The ball spline assembly has wide bearing surfaces with which balls contact in raceways formed by an outer sleeve and a shaft, thereby being able to transmit a large torque.

7 Claims, 4 Drawing Figures

UNLIMITED SLIDING BALL SPLINE ASSEMBLY

BACKGROUND OF THE INVENTION

The present invention relates in general to an improvement of an unlimited sliding ball spline assembly, and, in particular, to the ball spline assembly capable of transmitting a large torque and obtaining a ball spline assembly combination without any backlash.

Referring to FIG. 1, there is shown a conventional design of the unlimited sliding ball spline assembly. Such ball spline assembly comprises a thick cylindrical outer sleeve 2, the outer sleeve 2 being machined on the inside wall surface thereof to form plural parallel sleeve grooves 4 and further being machined to drill plural return holes 5 for non-loaded balls 6, the sleeve grooves 4 and return holes 5 extending substantially the entire length of the outer sleeve 2, a shaft 1 being inserted in the outer sleeve 2, the shaft 1 being machined on the outside wall surface thereof to form plural parallel shaft grooves 3 which extend substantially the entire length of the shaft 1, the parallel sleeve and shaft grooves 3 and 4 being opposite each other and forming plural rectilinear raceways for loaded balls 6, the return holes 5 and the rectilinear raceways for loaded balls being connected by connecting grooves to form endless raceways for balls 6, and relative displacements in the rectilinear directions and transmission of torque between the outer sleeve 2 and the shaft 1 being carried through the loaded balls 6 in the endless raceways.

However, in such conventional ball spline assembly, the diameter of the shaft 1 must be smaller than the minor diameter of the outer sleeve 2. Accordingly, when the shaft 1 rotates in the direction of arrow A of FIG. 1, the bearing surface 7 in each shaft groove 3 of the shaft 1 which contacts with the loaded balls 6 and receives the contact pressure in the direction of rotation of the shaft 1 becomes the arc $a_1 b_1$ which is formed from the intersecting point $a_1$, which the imaginary line between the center of the loaded ball 6 and the center axis of the shaft 1 crosses with the shaft groove 3, to the end point $b_1$ of the shaft groove 3, and this arc $a_1 b_1$ becomes inevitably smaller than the quarter circumference of the ball 6, and, further, an angle $\theta_1$, which the total contact pressure P in the perpendicular direction against the arc $a_1 b_1$ take against the imaginary line between the center of the loaded ball 6 and the center axis of the shaft 1, becomes inevitably smaller than 45°. Therefore, it is unavoidable that the component $P_1$ of the total contact pressure P in the direction of rotation becomes small and it is not possible to transmit a large torque.

SUMMARY OF THE INVENTION

In accordance with the present invention, the unlimited sliding ball spline assembly comprises a thick cylindrical outer sleeve, the outer sleeve being machined on the inside wall surface thereof to form plural parallel sleeve grooves each having a sleeve bearing surface and further being machined to drill plural return holes for non-loaded balls, the sleeve grooves being curved to conform to the curved surfaces of balls, a shaft being inserted in the outer sleeve, the shaft being machined on the outside wall surface thereof to form parallel shaft grooves which are half the number of the sleeve grooves, each shaft groove being curved transversely to conform to the curved surfaces of balls to form a pair of shaft bearing surfaces, the sleeve bearing surfaces and the shaft bearing surfaces being opposite each other and forming plural rectilinear raceways for loaded balls, the return holes and the rectilinear raceways being connected by connecting grooves of a pair of end members to form endless raceways for balls, ball holders being positioned in the shaft grooves respectively and between adjacent sleeve grooves, each ball holder being able to hold or retain the loaded balls in the sleeve groove, and said shaft having a maximum external diameter extending between the tops of ribs which are formed between the shaft grooves which is larger than the minimum internal diameter of the outer sleeve extending between the tops of projections on the outer sleeve which extend toward the shaft grooves, the maximum external diameter of the shaft and the minimum internal diameter of the outer sleeve being complementary to each other, thereby causing the sleeve and shaft bearing surfaces to enlarge considerably.

Accordingly, it is an object of the present invention to provide the unlimited sliding ball spline assembly capable of transmitting a large torque through the enlarged sleeve and shaft bearing surfaces.

It is another object of the present invention to provide the unlimited sliding ball spline assembly capable of obtaining a ball spline combination without any backlash, and which can be easily and accurately manufactured and whereby combination variation can be readily attained by properly selecting and combining various balls and shafts sizes.

The invention itself, as well as advantageous features thereof, will become apparent when reference is given to the following detailed description of preferred embodiment thereof, the detailed description referring to the annexed drawings.

DESCRIPTION OF THE PREFERRED EMBODIMENT

Figure 2:
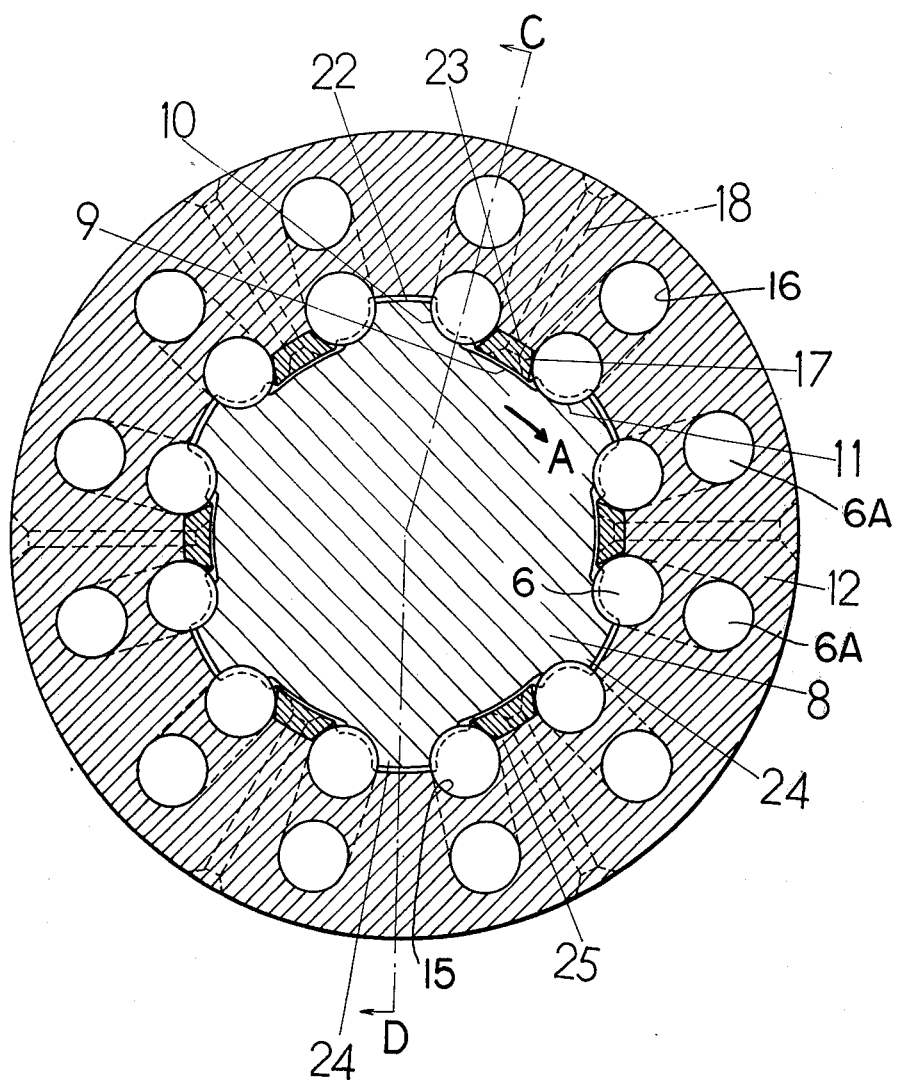
FIG. 2 is a sectional view of the unlimited sliding ball spline assembly according to an embodiment of the present invention.
Figure 3:
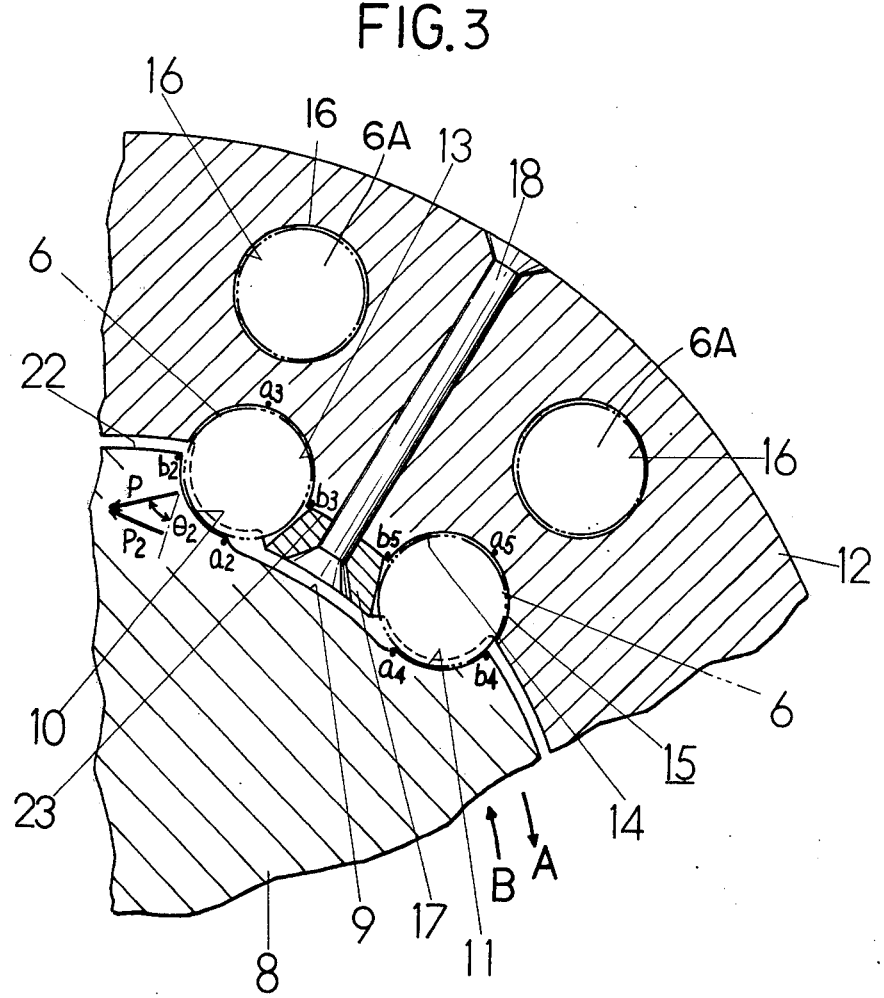
FIG. 3 is an enlarged fragmentary sectional view of FIG. 2.
Figure 4:
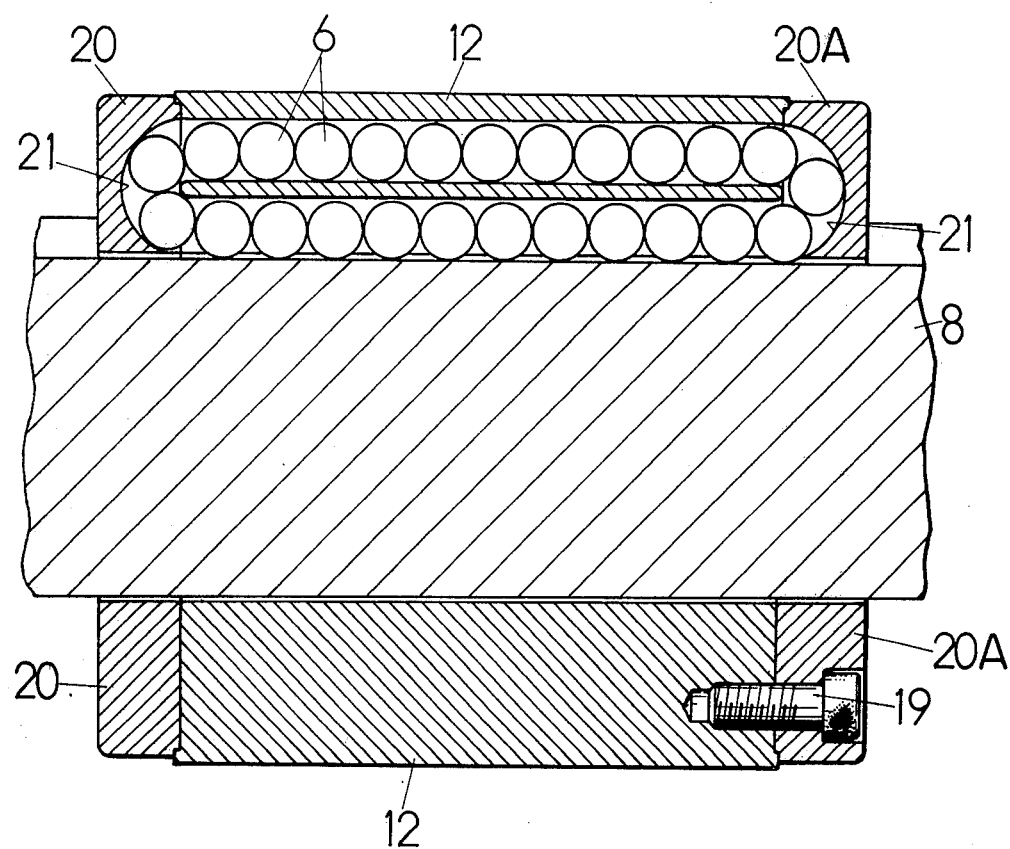
FIG. 4 is a longitudinal sectional view taken along the line C-D of FIG. 2.

Referring to FIGS. 2 through 4, there is shown the embodiment of the unlimited sliding ball spline assembly according to the present invention. The ball spline assembly comprises a thick cylindrical outer sleeve 12, a shaft 8 being inserted in the outer sleeve 12, plural balls 6A and ball holders 17 mounted on the inside wall surface of the outer sleeve 12.

The outer sleeve 12 is machined on the inside wall surface thereof to form plural parallel sleeve grooves 15 each having a nearly half circular cross-section and a sleeve bearing surface 13 or 14. The sleeve grooves 15 are curved to conform to the curved surfaces of balls 6, thereby causing the balls 6 to contact with the sleeve bearing surface 13 or 14 over the wide region thereof.

The outer sleeve 12 is further machined to drill to provide plural return holes or passages 16 for the non-loaded balls 6A along a longitudinal direction of the outer sleeve 12, and equal in number to the sleeve grooves 15.

The shaft 8 is inserted in the outer sleeve 12 and is machined on the outside wall surface thereof to form wide and parallel shaft grooves 9 which are half the number of the sleeve grooves 15. Each shaft groove 9 is curved transversely to conform to the curved surfaces of the balls 6 to form a pair of shaft bearing sufaces 10 and 11.

The sleeve bearing surfaces 13 and 14 and the shaft bearing surfaces 10 and 11 are opposite each other and form plural rectilinear raceways for the load balls 6, and the return holes 16 and the said rectilinear raceways for the loaded balls 6 are connected by connecting end grooves 21, which are respectively formed in a pair of end members 20A to form endless raceways for the balls 6A. The pair of the end members 20A are respectively mounted on the ends of the outer sleeve 12.

The ball holders 17 are positioned in the shaft grooves 9 respectively, and each ball holder 17 is mounted on the inside wall surface of the outer sleeve 12 by a fastener, such as a rivet 18. The ball holders 17 have side walls which are able to hold the loaded balls 6 in the sleeve grooves 15 in such a manner that the balls 6 can be slided smoothly.

When the shaft 8 rotates in the direction of A, the shaft bearing surface 10 becomes the arc $a_2 b_2$ which is formed from the intersecting point $a_2$, which the imaginary line between the center of the loaded ball 6 and the center axis of the shaft 8 crosses with the shaft groove 9, to the intersecting point $b_2$ which a maximum external diameter 22 crosses with the shaft groove 9, and the sleeve bearing surface 13 becomes the arc $a_3 b_3$ which is formed from the intersecting point $a_3$, which said imaginary line crosses with the sleeve groove 15, to the intersecting point $b_3$ which a minimum internal diameter 23 of the outer sleeve 12 crosses with the sleeve groove 15. When the shaft 8 rotates in the direction of B, the shaft bearing surface 11 becomes the arc $a_4 b_4$ and the sleeve bearing surface 14 becomes the arc $a_5 b_5$.

The maximum external diameter 22 of the shaft 8 as drawn by joining the tops of the ribs 24 which are formed between the shaft grooves 9 is larger than the minimum internal diameter 23 of the outer sleeve 12 as drawn by joining the tops of the projections 25 on the outer sleeve 12 which are positioned in the shaft grooves 9, and the maximum external diameter 22 of the shaft 8 and the minimum internal diameter 23 of the outer sleeve 12 are complementary to each other, thereby causing the respective sleeve and shaft bearing surfaces 10, 11, 13 and 14 to become larger than the quarter circumference of the ball 6.

Figure 1:
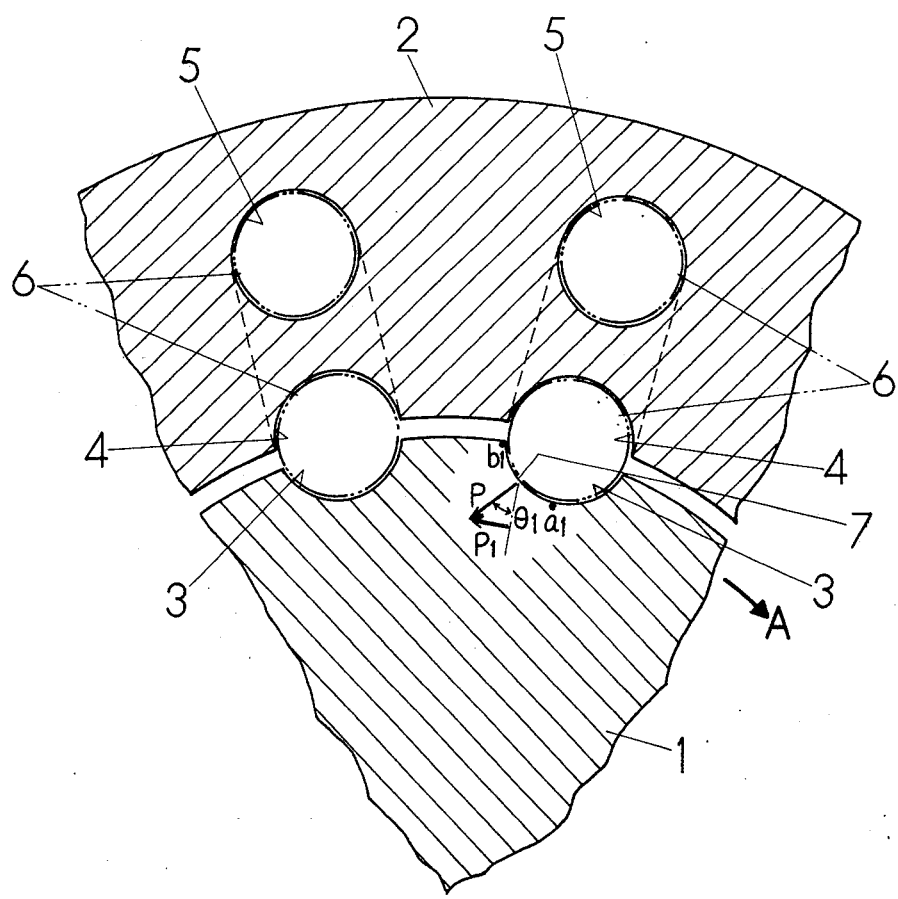
FIG. 1 is a fragmentary sectional view of the conventional unlimited sliding ball spline assembly.

In operation, when the shaft 8 rotates in the direction of A on FIG. 3, the balls 6 in the shaft grooves 9 which are positioned in the back or trailing position in the direction of the rotation are in contact with the shaft and sleeve bearing surfaces 10 and 13, thereby causing a larger torque force to be imparted between the sleeve and shaft. Whereupon, the arc $a_2 b_2$ of each bearing surface 10 or 13 becomes larger than the quarter circumference of the ball 6, and thereby the each bearing surface 10 or 13 becomes larger than the bearing surface 7 of the conventional ball spline as shown in FIG. 1. Consequently, an angle $\theta_2$, which the total contact pressure P in the perpendicular direction against the bearing surface 10 or 13 take against the said imaginary line, becomes considerably larger than 45°. It thereofore is possible to enlarge the component $P_2$ of the total pressure P in the direction of as it is rotation much larger than the $P_1$ of the conventional ball spline as shown in FIG. 1.

Moreover, in the ball spline embodied in the present invention, the balls 6 in the endless raceways are always retained on the outer sleeve 12 by the ball holders 17. Therefore, when the shaft 8 is removed from the outer sleeve 12, the balls 6 do not fall from the endless raceways of the outer sleeve 12. Consequently, it is possible to select and combine the balls 6 in the endless raceways of the outer sleeve 12 in order to prevent any backlash from occurring and to set up easily and accurately a ball spline combination.

When the ball spline assembly is applied to a machine, such as an automatic tool changer, there often occurs such a case as it is necessary to separately mount the shaft 8 and the outer sleeve 12 on the machine. In such a case, if there is not the ball holder, it is impossible to assemble the ball spline, or it is difficult to select and combine the balls in the endless raceways, thereby causing the quality of the ball spline to be poor. In the present invention, such defects are overcome by way of the ball holder 17.

What is claimed is:

1. A sliding ball spline assembly comprising a cylindrical outer sleeve and a shaft extending through said sleeve, and means for coupling said sleeve to said shaft for relative rectilinear movement in an axial direction and in rotational torque transmitting relationship, said coupling means including a plurality of circumferentially spaced apart longitudinally extending sleeve grooves formed along the inner circumferential surface of said sleeve, each of said sleeve grooves having a bearing surface, a return passage formed in said sleeve corresponding in number to the number of said sleeve grooves, said return passages being radially spaced from its respective corresponding sleeve groove, a pair of end members connected to the opposed ends of said sleeve, each of said end members having end grooves for connecting the corresponding sleeve grooves and return passages into communication to define an endless raceway, said shaft having a plurality of longitudinally extending shaft grooves formed in the outer surface thereof, the number of shaft grooves being equal to one half the number of sleeve grooves, said shaft grooves each having a pair of opposed bearing surfaces, a rib defined in the space between adjacent shaft grooves, said opposed bearing surfaces being curved transversely to complement the bearing surfaces of opposite adjacent pairs of said sleeve grooves, said sleeve having a projection extending into a shaft groove between the opposed bearing surfaces of said shaft groove, a plurality of ball bearings disposed in each of said endless raceways, said bearing surfaces of said sleeve grooves and shaft grooves conforming to the circumference of said ball bearings, a ball retainer extending into each of said shaft grooves, said ball retainer being disposed between the opposed bearing surfaces of said respective shaft grooves, said ball retainer having opposed side walls for positively retaining the ball bearing in adjacent pairs of sleeve grooves within their respective grooves.

2. A sliding ball spline assembly as defined in claim 1 wherein said shaft has a maximum external diameter extending between opposed ribs which is greater than the minimum internal diameter extending between opposed projections defined between opposed pairs of sleeve grooves.

3. A sliding ball spline assembly as defined in claim 2 and wherein said ball retainer is connected to each of said projections, and a fastening means for connecting said ball retainer to its respective projection and said ball retainer extending into the associated shaft groove and beyond the center of the ball bearings in said sleeve grooves.

4. A sliding ball spline assembly as defined in claim 3 wherein said fastening means comprises a rivet extending through said sleeve between adjacent raceways formed therein.

5. A sliding ball spline assembly as defined in claim 1 wherein said ball retainer is connected to each of said projections.

6. A sliding ball spline assembly as defined in claim 1 wherein the opposed bearing surfaces of each said shaft groove closely conforms to the circumference of the respective ball bearings disposed in adjacent raceways whereby the bearing surface exceeds a quarter circumference of said ball bearings.

7. A sliding ball spline assembly as defined in claim 1 wherein only a portion of the ball bearing in an associated raceway are loaded when a rotational torque is imparted to said shaft.

* * * * *